(12) United States Patent
Petillo

(10) Patent No.: US 6,998,188 B2
(45) Date of Patent: Feb. 14, 2006

(54) FUEL CELL COMPONENTS

(76) Inventor: Phillip J. Petillo, 1206 Herbert Ave., Ocean, NJ (US) 07712

( * ) Notice: Subject to any disclaimer, the term of this patent is extended or adjusted under 35 U.S.C. 154(b) by 226 days.

(21) Appl. No.: 10/368,290

(22) Filed: Feb. 18, 2003

(65) Prior Publication Data

US 2003/0219641 A1 Nov. 27, 2003

Related U.S. Application Data

(60) Provisional application No. 60/357,929, filed on Feb. 19, 2002, provisional application No. 60/383,189, filed on May 24, 2002.

(51) Int. Cl.
*H01M 2/00* (2006.01)
*H01M 4/86* (2006.01)

(52) U.S. Cl. .......................... 429/34; 429/40

(58) Field of Classification Search ................ 429/34, 429/35, 32, 18, 40
See application file for complete search history.

(56) References Cited

U.S. PATENT DOCUMENTS

| | | | |
|---|---|---|---|
| 3,961,987 A * | 6/1976 | Mund et al. ................ | 429/44 |
| 4,195,119 A | 3/1980 | Kummer ..................... | 429/38 |
| 4,533,455 A | 8/1985 | Balko et al. ................ | 204/279 |
| 4,659,559 A * | 4/1987 | Struthers .................... | 429/46 |
| 5,264,299 A | 11/1993 | Krasij et al. ................ | 429/30 |
| 5,342,706 A | 8/1994 | Marianowski et al. ....... | 429/35 |
| 5,543,240 A | 8/1996 | Lee et al. ................... | 429/38 |
| 5,707,755 A | 1/1998 | Grot ........................... | 429/40 |
| 5,945,232 A | 8/1999 | Ernst et al. ................. | 429/32 |
| 6,020,083 A | 2/2000 | Breault et al. .............. | 429/36 |
| 6,057,053 A | 5/2000 | Gibb .......................... | 429/37 |
| 6,066,409 A | 5/2000 | Ronne et al. ............... | 429/39 |
| 6,080,290 A | 6/2000 | Stuart et al. ................ | 204/269 |
| 6,132,895 A | 10/2000 | Pratt et al. .................. | 429/39 |
| 6,159,627 A | 12/2000 | Yuh et al. ................... | 429/34 |
| 6,171,720 B1 | 1/2001 | Besmann et al. ........... | 429/39 |
| 6,232,008 B1 | 5/2001 | Wozniczka et al. ......... | 429/39 |
| 6,255,011 B1 | 7/2001 | Fujii et al. .................. | 429/32 |
| 6,261,710 B1 | 7/2001 | Marianowski ............... | 429/34 |
| 6,261,711 B1 | 7/2001 | Matlock et al. ............. | 429/34 |
| 6,277,511 B1 | 8/2001 | Iwase et al. ................ | 429/32 |
| 6,277,513 B1 | 8/2001 | Swathirajan et al. ........ | 429/44 |
| 6,280,872 B1 | 8/2001 | Ozaki et al. ................ | 429/42 |
| 6,287,717 B1 | 9/2001 | Cavalca et al. ............. | 429/40 |
| 6,291,092 B1 | 9/2001 | Kohli et al. ................ | 429/33 |
| 6,294,128 B1 | 9/2001 | Crosbie ...................... | 264/618 |
| 6,294,280 B1 | 9/2001 | Tanaka et al. .............. | 429/34 |
| 6,299,996 B1 | 10/2001 | White et al. ................ | 429/22 |
| 6,306,530 B1 | 10/2001 | Blondin et al. ............. | 429/13 |
| 6,309,773 B1 | 10/2001 | Rock .......................... | 429/34 |
| 6,316,134 B1 | 11/2001 | Cownden et al. ........... | 429/19 |
| 6,322,919 B1 | 11/2001 | Yang et al. .................. | 429/34 |

(Continued)

*Primary Examiner*—Patrick Joseph Ryan
*Assistant Examiner*—Thomas H. Parsons
(74) *Attorney, Agent, or Firm*—Michael B. Einschlag

(57) ABSTRACT

One embodiment of the present invention is a fuel cell component that includes: (a) a membrane structure; (b) a fuel electrode disposed on one side of and in contact with the membrane structure; (c) an oxidizer electrode disposed on a second side of and in contact with the membrane structure; and (d) the fuel electrode comprising a fuel distribution portion and a fuel electrical connection portion, and the oxidizer electrode comprising an oxidizer distribution portion and an oxidizer electrical connection portion; wherein the fuel electrical connection portion is disposed at an angle with respect to the fuel distribution portion and the oxidizer electrical connection portion is disposed at an angle with respect to the oxidizer distribution portion.

11 Claims, 11 Drawing Sheets

U.S. PATENT DOCUMENTS 6,326,098 B1   12/2001   Itoh et al. ..................... 429/40
6,329,093 B1   12/2001   Ohara et al. .................. 429/32
6,342,316 B1    1/2002   Okamoto et al. ............. 429/19
6,649,297 B1 * 11/2003   Marchand et al. ............ 429/34

* cited by examiner

FUEL CELL COMPONENTS

This application claims the benefit of U.S. Provisional Application No. 60/357,929, filed on Feb. 19, 2002; and U.S. Provisional Application No. 60/383,189, filed on May 24, 2002, both of which are incorporated herein by reference.

TECHNICAL FIELD OF THE INVENTION

One or more embodiments of the present invention pertain to a fuel cell.

BACKGROUND OF THE INVENTION

A typical fuel cell involves a redox process wherein reduction and oxidation processes are spatially separated and electrons given off in the reduction process can be passed as a current through a load, for example an electric motor of a motor vehicle. A well known example of a fuel cell entails use of hydrogen as a fuel for the reduction process and oxygen as the oxidizer for the oxidation process. For such fuel cells, a fuel that is readily available and can easily be stored, for example, a hydrocarbon such as natural gas or methanol, is reformed to provide a hydrogen-rich gas, and oxygen may be obtained by use of air.

A typical such fuel cell uses a proton exchange membrane ("PEM") as its electrolyte. Such a membrane is an electronic insulator, but is an excellent conductor of hydrogen ions. An example of one such membrane is a copolymeric perfluorocarbon material containing a basic unit of fluorinated carbon chain and a sulphonic acid group (there may be variations in the molecular configurations of this membrane). PEMs are commercially available from a number of sources, for example, E. I. DuPont de Nemours Company offers a PEM manufactured from a perfluorcarbon material under the trademark Nafion. To fabricate a fuel cell, a PEM may be coated on both sides with active catalysts (as is also well known, catalysts may also be applied as coatings to electrodes), for example in the form of highly dispersed metal alloy particles (for example, mostly platinum). Typically, the catalyst is rough and porous so that a maximum surface area of the catalyst can be exposed to the fuel, for example, hydrogen or the oxidizer, for example, oxygen.

In practice, in one example of such a fuel cell, pressurized hydrogen gas ($H_2$) enters the fuel cell on an anode side, and is forced through the catalyst by the pressure. Hydrogen molecules react electrochemically in the presence of the catalyst by dissociating into hydrogen atoms. The hydrogen atoms release electrons and become hydrogen ions, i.e., protons (the anode side reaction is: $2H_2 => 4H^+ + 4e^-$). The released electrons are conducted through the anode, and travel in the form of an electric current that can be utilized in an external circuit before arriving at a cathode side of the fuel cell. The hydrogen ions diffuse through the PEM to a cathode side of the fuel. At the same time, pressurized oxygen gas ($O_2$) enters the fuel cell on the cathode side, and is forced through the catalyst by the pressure. Oxygen molecules react electrochemically in the presence of the catalyst by dissociating into oxygen atoms. The oxygen atoms accept electrons from the external circuit. Each negatively charged oxygen ion attracts two $H^+$ ions through the PEM where they combine to form a water molecule ($H_2O$), thus completing the overall process (the cathode side reaction is: $O_2 + 4H^+ + 4e^- => 2H_2O$). A typical such PEM fuel cell: (a) operates at relatively low temperatures, from about 70° C. to about 85° C. (the low temperature of operation also reduces or eliminates the need for thermal insulation to protect personnel or other equipment); (b) produces water that is carried from the back of the cathode side of the fuel cell by the oxidizer gas stream; and (c) produces electrical energy which is the sum of the separate half cell reactions occurring in the fuel cell less its internal losses (typically about 0.45 to about 0.7 volts D.C. under a load). To get this voltage up to a practical level, many separate fuel cells are combined to form a fuel cell stack where multiple cells are electrically connected in series. The fuel cell stack: (a) is typically enclosed in a housing; (b) includes manifolds to direct fuel and oxidizer to the electrodes; and (c) is configured to provide cooling either by the reactants or by a cooling medium. Also included within a typical such fuel cell stack are current collectors, cell-to-cell seals, insulation, piping, and instrumentation. The stack, housing, and associated hardware make up a fuel cell module.

Some recognized advantages of fuel cells are: (a) they can power cars without polluting the environment; (b) they could enable regions with poorly developed infrastructures to generate electricity locally; (c) they exhibit high efficiency when compared to that of conventional combustion engines; and (d) their use might mean breaking dependence on crude oil and other fossil fuels.

Although there appear to be economic advantages of designs based on fuel cell stacks which utilize bipolar plates, this design has various disadvantages which have detracted from its usefulness. For example, if the voltage of a single cell in a fuel cell stack declines significantly or fails, the entire fuel cell stack (typically held together with tie bolts) must be taken out of service, disassembled, and repaired. In addition, in such fuel cell stack designs, fuel and oxidizer are directed to the electrodes by means of internal manifolds. Cooling for the fuel cell stack is provided either by the reactants, natural convection, radiation, and possibly by supplemental cooling channels and/or cooling plates. Also included in such fuel cell stack designs are current collectors, cell-to-cell seals, insulation, piping, and various instrumentation for use in monitoring cell performance. Such traditional designs are unduly large, cumbersome, and quite heavy.

In addition, further problems with fuel cells as they are produced today are: (a) such fuel cells are expensive; (b) they are fabricated utilizing parts that are difficult to machine and fabricate; (c) they are difficult to assemble (their design does not lend itself to automated assembly) and repair; (d) their shape or form is limited; (e) they are bulky and heavy; and (f) so forth.

In light of the above, there is a need in the art for a fuel cell and of fabricating a fuel cell that solves one or more of the above-identified problems.

SUMMARY OF THE INVENTION

One or more embodiments of the present invention satisfy one or more of the above-identified problems in the art. In particular, one embodiment of the present invention is a fuel cell component that comprises: (a) a membrane structure; (b) a fuel electrode disposed on one side of and in contact with the membrane structure; (c) an oxidizer electrode disposed on a second side of and in contact with the membrane structure; and (d) the fuel electrode comprising a fuel distribution portion and a fuel electrical connection portion, and the oxidizer electrode comprising an oxidizer distribution portion and an oxidizer electrical connection portion; wherein the fuel electrical connection portion is disposed at an angle with respect to the fuel distribution portion and the oxidizer electrical connection portion is disposed at an angle with respect to the oxidizer distribution portion.

DETAILED DESCRIPTION

Figure 1:
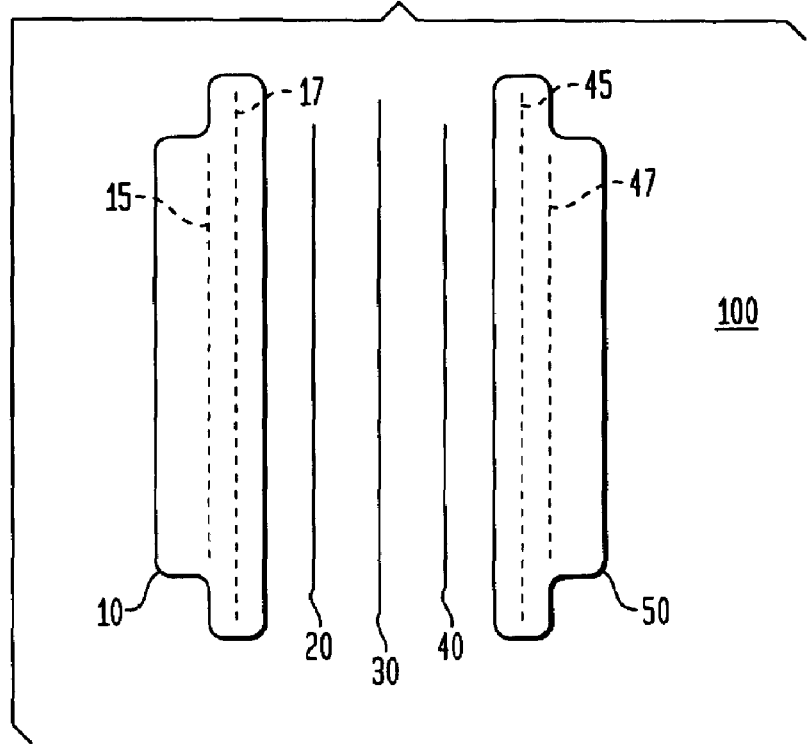
FIG. 1 shows an exploded cross section of a fuel cell component that is fabricated in accordance with one or more embodiments of the present invention.

FIG. 1 shows an exploded cross section of fuel cell component 100 that is fabricated in accordance with one or more embodiments of the present invention. As shown in FIG. 1, case 10 is a container that may be fabricated from, for example and without limitation, plastic, polysulfoam, metal, ceramic, and so forth. Dotted line 15 of case 10 indicates a first recess that is suitable for holding conductor plate 20 and dotted line 17 of case 10 indicates a second recess that is suitable for holding at least a portion of: (a) membrane 30 or (b) a frame that holds at least a portion of membrane 30. In accordance with one or more embodiments of the present invention, case 10 may be fabricated by molding plastic or ceramic in accordance with any one of a number of methods that are well known to those of ordinary skill in the art. In accordance with one or more further embodiments of the present invention, case 10 may be fabricated by stamping plastic or metal in accordance with any one of a number of methods that are well known to those of ordinary skill in the art. In accordance with one or more still further embodiments of the present invention, case 10 may be fabricated by forming an appropriate shape in a first material such as a metal, and by coating the shape with a second material such as a plastic or ceramic in accordance with any one of a number of methods that are well known to those of ordinary skill in the art. As one can readily appreciate, a frame for holding membrane 30 may be fabricated using the same types of materials and using the same types of fabrication techniques described above for use in fabricating case 10.

Conducting plate 20 has at least an electrically conducting surface that may be fabricated from an electrically conductive material such as, for example and without limitation, metal, metal plated material, conductive ceramic, conductive epoxy, and so forth. For example, conducting plate 20 may be fabricated from gold, platinum, silver, nickel, nickel alloy such as, for example and without limitation, nickel-chrome and nickel-aluminum, suitable metal or metals from Groups 8–11 of the Periodic Table, or an electrically conductive coating such as, for example and without limitation, gold flashing. The thickness of the conductive surface of conducting plate 20 will be determined by resistance provided by a particular design. For example and without limitation, conducting plate 20 may be fabricated from copper which is gold plated with a 2 micron thick layer of gold. As will be described below in conjunction with FIG. 2, in accordance with one or more embodiments of the present invention, at least a portion of a surface of conducting plate 20 which faces membrane 30 has grooves or channels fabricated therein to facilitate the flow of fuel or oxidizer therethrough.

Membrane 30 is, for example and without limitation, a proton exchange membrane such as a perfluorinated sulfonic acid copolymer that is available from E. I. DuPont de Nemours Company under the trademark Nafion; a perfluorocarbon copolymer such as those available from Dow Chemicals Company; any material that is characterized, in such an application, by a high conductivity for hydrogen ions or hydronium ions $H3O^+$ like those available from the Celanese Corporation; and any one of many other examples that are well known to those of ordinary skill in the art. It should be appreciated that it is within the spirit of the present invention that one or more embodiments exist which utilize any kind of membrane that may serve in fabricating a fuel cell. In the cross section shown in FIG. 1, conducting plate 40 and case 50 are similar to or the same as conducting plate 20 and case 10, respectively, described above. As such, dotted line 45 of case 50 indicates a recess like that indicated by dotted line 17 of case 10, and dotted line 47 of case 50 indicates a recess like that indicated by dotted line 15 of case 10.

As is well known, anode and cathode fuel cell reduction and oxidation reactions require catalysts to proceed at useful rates. As such, commercial PEMs typically include, or can be coated, with thin catalyst layers that are disposed on a first electrode catalyst side and a second electrode catalyst side of the PEM. In some embodiments catalyst layers are bonded to the PEM, and in further embodiments catalyst layers are coated or bonded to surfaces of conducting plates 20 and 40. Various materials are suitable for forming such catalyst layers. These materials include, for example and without limitation, iridium, platinum, platinum with carbon black, palladium, ruthenium, ruthenium with carbon black, platinum-ruthenium, selenium, rubidium, rhenium, samarium, and so forth. However, in order to save the cost of expensive noble metals, it is possible to use non-noble metal based alloys such as for example Ni, Fe or Co and to coat them with noble metals by common electrochemical or chemical processes. Other suitable catalytic materials include non-metals, (for example, electronically conducting mixed oxides with a spinel or perovskite structure). According to one embodiment, the hydrogen electrode catalyst is platinum, and the oxygen electrode catalyst is either platinum or another oxygen reducing catalyst (for example and without limitation, a macrocyclic chelate compound). Additionally, in accordance with one or more embodiments of the present invention, an electrolyte deposit is permeable to the fuel, the oxidizer, and the products of the reaction between the fuel and the oxidizer. And, in accordance with one or more further embodiments of the present invention, member 30 is a solid electrolyte that is capable of being made in very thin layers, often below one micrometer in thickness.

As indicated by FIG. 1, fuel cell component 100 is fabricated in halves, much like a clam shell. Then the halves of the cell are brought together and held in place utilizing any one of a number of attachment mechanisms such as, for example, and without limitation, adhesives, screws, rivets, ultrasonic welds, hot pressing, locking tabs, and so forth.

Figure 2:
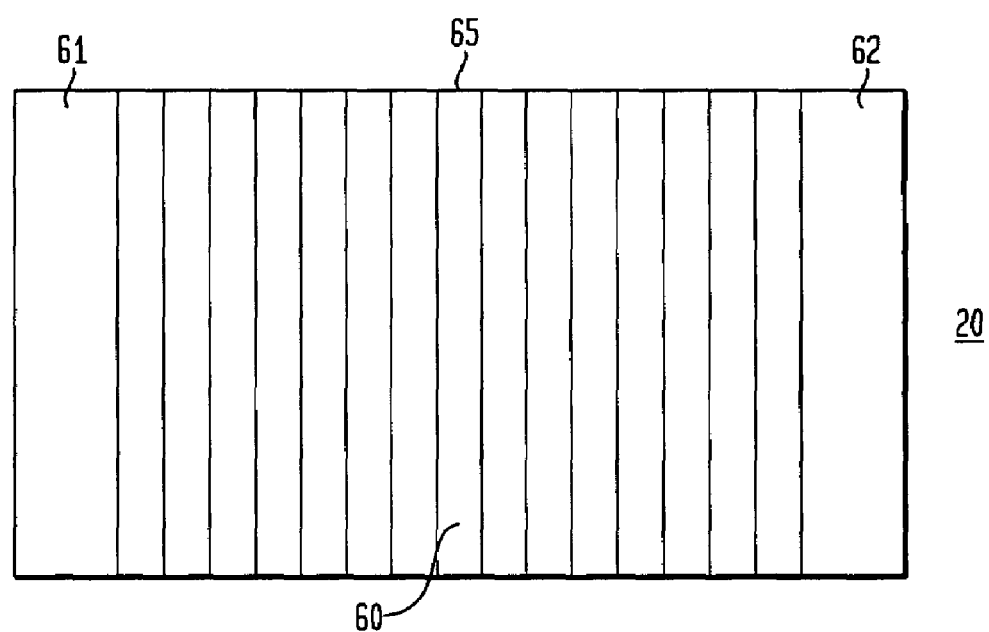
FIG. 2 shows a top view of a conducting plate shown in FIG. 1.

FIG. 2 shows a top view of conducting plate 20 described above with respect to FIG. 1. As shown in FIG. 2, conducting plate 20 has substantially parallel grooves 60 extending across the face thereof. The grooves serve as flow channels for fuel such as, for example and without limitation, hydrogen gas to help disperse the fuel substantially uniformly (grooves in similarly constructed conducting plate 40 serve as flow channels for oxidizers such as, for example and without limitation, oxygen or air to help disperse the oxidizer substantially uniformly). Although grooves 60 are shown as substantially parallel lines, they may be formed as channels that are arrayed in any design, pattern, or morphology that provides adequate flow of fuel (or oxidizer in the case of conducting plate 40) sufficient to provide the required energy output for a fuel cell fabricated from such a component. Grooves 60 may formed, for example and without limitation, by acid etching, sandblasting, or knurling the conductive surface of conducting plate 20 to provide passageways for the fuel (or oxidizer in the case of conducting plate 40). Alternatively, conducting plate 20 may be fabricated in a stamping process. In accordance with one or more embodiments of the present invention, the sides of grooves 60 may be perpendicular to the surface of conducting plate 20 or they may be disposed at an angle to the surface of conducting plate 20, for example and without limitation, an angle from 2 degrees to 45 degrees. In accordance with one or more embodiments of the present invention, grooves 60 are close together, on the order of 0.005 inch or so, and are fabricated from an electrically conductive material. Grooves 60 in conducting plate 20 (and conducting plate 40) enable fuel (or oxidizer in the case of conducting plate 40) to flow and contact membrane 30, which membrane 30 contacts conducting plates 20 and 40 when fuel cell component 100 is assembled. In accordance with one or more embodiments of the present invention, conducting plates 20 and 40 are fabricated as described above, and then cases 10 and 50 are formed by injected molding about conducting plates 20 and 40, respectively. In accordance with one or more embodiments of the present invention, conducting plate 20 may be fabricated as a part of case 10 or fabricated as one piece into case 10. Lastly, FIG. 2 shows electrical conductor connectors 61 and 62 of conducting plate 20, the configuration of which electrical conductor connectors 61 and 62 will be described in detail below in conjunction with FIG. 3.

One or more further embodiments of the present invention are directed to address a well known problem. In solid polymer fuel cells which employ an ion exchange membrane, the water content of the membrane affects the performance of the fuel cell. For example, the ion conductivity of the membrane generally increases as the water content or hydration of the membrane increases. Therefore it is desirable to maintain a sufficiently high level of hydration in the membrane during fuel cell operation. For this reason, reactant streams are typically humidified prior to introducing them into electrochemically active regions of the fuel cell. Since the fuel cell produces water, this water may be used to moisten membrane 30. Moistening membrane 30 by the customarily employed manner has a drawback, however, in that, particularly during the start-up phase of the fuel cell system, no water has been produced at that time. Nevertheless, even at that time it is necessary to moisten membrane 30 of the fuel cell to prevent damage. In addition, the capacity of reactant gases to absorb water vapor varies significantly with changes in temperature and pressure. Therefore, it is preferred to humidify the reactant gas streams at or as near as possible to the operating temperature and pressure within the fuel cell. If the reactant gas is humidified at a temperature higher than the fuel cell operating temperature, this can result in condensation of liquid water when humidified reactant gas enters the fuel cell. Condensation may cause flooding in the electrodes which may detrimentally affect fuel cell performance. Conversely, if the reactant gas stream is humidified at a temperature lower than the fuel cell operating temperature, the reduced water vapor content in the reactant gas stream could result in membrane dehydration and damage to the membrane.

In accordance with one or more further embodiments of the present invention, conducting plate 20 described above may have grooves 60 coated with a conductive hydrophobic material, which hydrophobic material contacts membrane 30 when fuel cell component 100 is assembled. Advantageously, the hydrophobic material operates to keep membrane 30 moist so that the need for humidification is reduced or eliminated. As a result, the complexity and cost of a fuel cell fabricated utilizing such an assembly is greatly reduced. In accordance with one or more still further embodiments of the present invention, the back side of conducting plate 20 may be coated with a hydrophilic material. Advantageously such a hydrophilic material helps to keep moisture away from the conductor plate. Hydrophobic and hydrophilic membranes that are suitable for fabricating one or more embodiments of the present invention are available from Pall Corporation of East Hills, N.Y.; Sefar America, Inc. of Depew, N.Y.; Celgard, Inc.; Porvair, Inc.; and W. L. Gore & Assoc.

Figure 3:
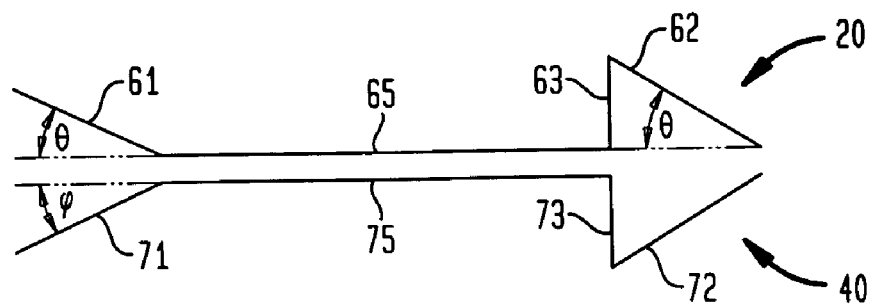
FIG. 3 shows a cross section of two conducting plates of the type shown in FIG. 2.

FIG. 3 shows a cross section of conducting plates 20 and 40. As shown in FIG. 3, conducting plate 20 comprises: (a) wing 61 having at least a conducting surface that makes an angle θ with respect to a surface of grooved portion 65; (b) wing 62 having at least a conducting surface that also makes an angle θ with respect to the surface of grooved portion 65; and (c) connector 63 having at least a conducting surface. As further shown in FIG. 3, conducting plate 40 comprises: (a) wing 71 having at least a conducting surface that makes an angle φ with respect to a surface of grooved portion 75; (b) wing 72 having at least a conducting surface that also makes an angle φ with respect to the surface of grooved portion 75; and (c) connector 73 having at least a conducting surface. In accordance with one or more embodiments of the present invention, wings 61 and 62 form electrodes for conducting plate 20, and wings 71 and 72 form electrodes for conducting plate 40. In accordance with one embodiment of the present invention θ and φ are equal to 30°±10°.

Figure 4:
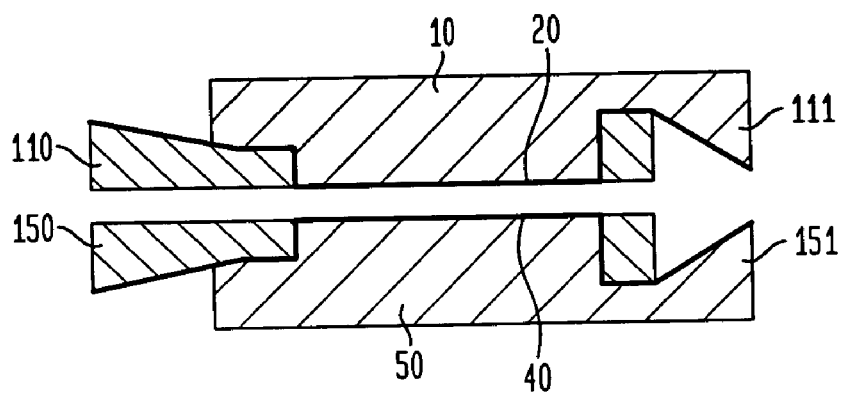
FIG. 4 shows a cross section of one embodiment of a conducting plate and case assembly.

FIG. 4 shows a cross section of conducting plates 20 and 40 shown in FIG. 3 wherein cases 10 and 50 have been fabricated in accordance with one or more embodiments of the present invention with protrusions 110, 111 and 150, 151 that provide structural support for conducting plates 20 and 40, respectively. As one can readily appreciate from FIG. 4, when fuel cell component 100 is assembled, the electrodes at the opposing ends of conducting plates 20 and 40 are arranged in the form of dovetails. Further, in accordance with one or more embodiments of the present invention, as will be described in detail below, such fuel cell components may be stacked by sliding one end of an electrode pair into an opposing end of an electrode pair in a dovetail arrangement. Alternatively, in accordance with one or more embodiments of the present invention, when fuel cell component 100 is assembled, fuel cell components may be stacked in any one of a number of configurations such as, for example and without limitation, and as will be described in detail below, by sliding one end of an appropriate interconnector into opposing ends of electrode pairs in a dovetail arrangement. Cases 10 and 50 having protrusions like those shown in FIG. 4 may be fabricated in accordance with any one of a number of methods that are well known to those of ordinary skill in the art.

Figure 5:
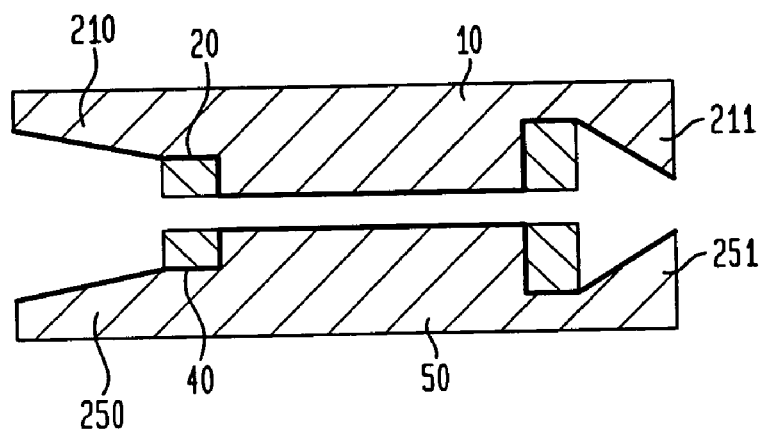
FIG. 5 shows a cross section of another embodiment of a conducting plate and case assembly.

FIG. 5 shows a cross section conducting plates 20 and 40 shown in FIG. 3 wherein cases 10 and 50 have been fabricated in accordance with one or more embodiments of the present invention with protrusions 210, 211 and 250, 251 that provide structural support for conducting plates 20 and 40, respectively. In accordance with one or more embodiments of the present invention, when fuel cell component 100 is assembled, fuel cell components may be stacked in any one of a number of configurations such as, for example and without limitation, and as will be described in detail below, by sliding one end of an appropriate interconnector into opposing ends of electrode pairs in a dovetail arrangement. Cases 10 and 50 having protrusions like those shown in FIG. 5 may be fabricated in accordance with any one of a number of methods that are well known to those of ordinary skill in the art.

Figure 6:
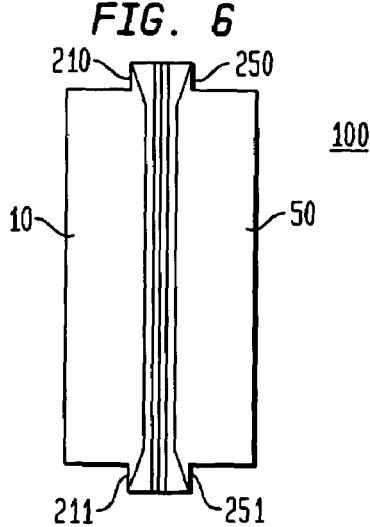
FIG. 6 shows a cross section of a fuel cell component that is fabricated in accordance with one or more embodiments of the present invention.

FIG. 6 shows a cross section of fuel cell component 100 which shows: (a) end 210 of case 10 that admits fuel into fuel cell component 100; (b) end 211 of case 10 that exhausts spent fuel from fuel cell component 100; (c) end 250 of case 50 that admits oxidizer into fuel cell component 100; and (d) end 251 of case 50 that exhausts spent fuel and oxidation reactants from fuel cell component 100. For example, as shown in FIG. 6, ends 210 and 250 include channels that funnel fuel (for example and without limitation, hydrogen gas) into flow channels in conducting plate 20 and oxidizer (for example and without limitation, air) into flow channels in conducting plate 40, respectively. In accordance with one or more such embodiments, appropriate channels (for example and without limitation, slots or holes) may be fabricated in ends 210, 211, 250 and 251 of cases 10 and 50, respectively, in accordance with any one of a number of methods that are well known to those of ordinary skill in the art such as, for example and without limitation, injection molding plastic. In accordance with one or more further embodiments of the present invention, ends of conducting plates 20 and 40 may be shaped, for example and without limitation, by being bent at an angle, to line portions of one or more of the channels in ends 210, 211, 250 and 251.

Figure 7:
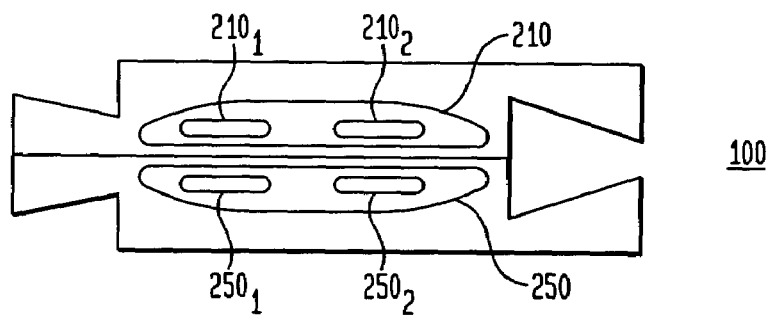
FIG. 7 is a top view of the fuel cell component shown in FIG. 6.

FIG. 7 is a top view of fuel cell component 100 which shows ends 210 and 250 of cases 10 and 50, respectively. As will described below, appropriate input manifolds connect to ends 210 and 250 of cases 10 and 50, respectively, to provide a mechanism to admit fuel and oxidizer, respectively, into fuel cell assembly 100. As one can readily appreciate, appropriate manifolds may also be used to connect to ends 211 and 251 of cases 10 and 50, respectively, to provide a mechanism to output excess fuel and oxidizer, respectively, and reactant from fuel cell assembly 100. Further, as will be described in detail below, a reactant such as, for example and without limitation, water may be channeled by the exhaust manifold to a reservoir to be stored or disposed of to prevent the build up of the reactant within fuel cell assembly 100.

Figure 8:
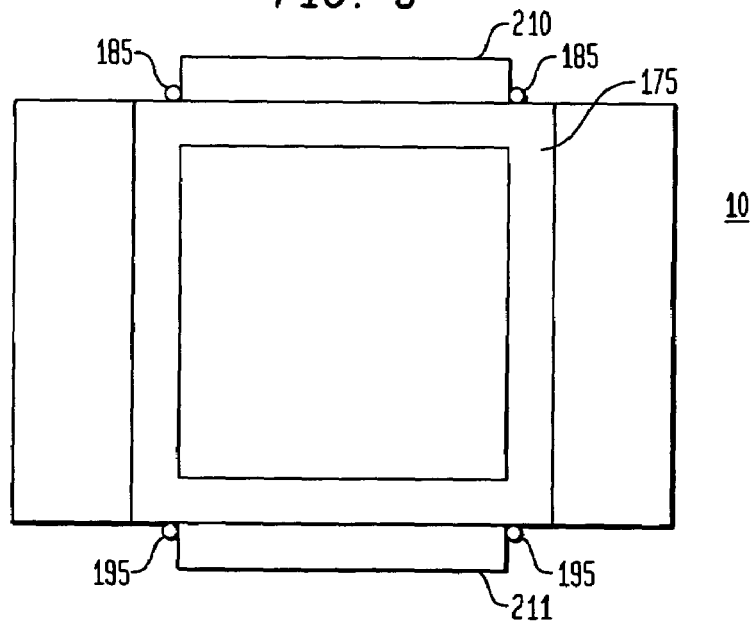
FIG. 8 shows a side view of a case for a fuel component that is fabricated in accordance with one or more embodiments of the present invention.

FIG. 8 shows a side view of case 10 in an embodiment wherein conducting plate 20 is molded into case 10. FIG. 8 shows a position of frame 175 (frame 175 holds membrane 30) with respect to case 10. In accordance with one or more embodiments of the present invention, frame 175 is molded as a portion of case 10, and in accordance with one or more further embodiments of the present invention, frame 175 is manufactured as a separate part. When frame 175 is manufactured as a separate part, it may be affixed to case 10 by any one of a number of methods that are well known to those of ordinary skill in the art such as, for example, and without limitation, by placement in a recess, by insert molding, and so forth. FIG. 8 further shows O-rings 185 and 195 that are used to seal a manifold to input and output ends of fuel cell component 100, respectively.

Figure 9:
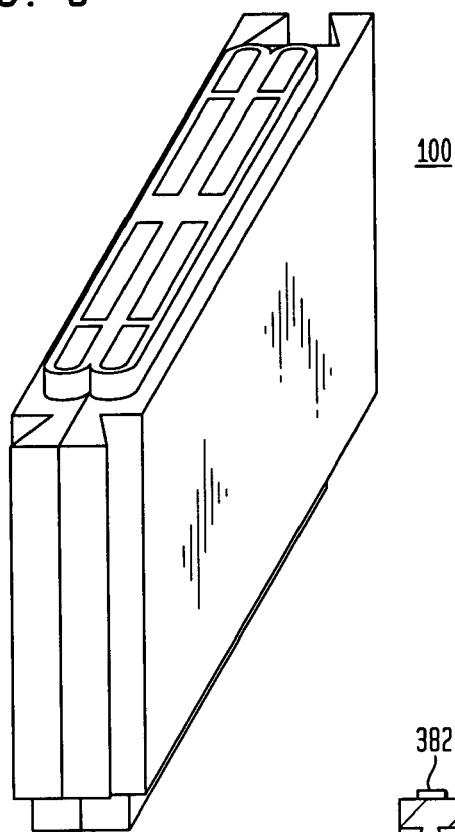
FIG. 9 shows a perspective view of an assembled fuel cell component that is fabricated in accordance with one or more embodiments of the present invention.

FIG. 9 shows a perspective view of assembled fuel cell component 100. The description given above referred to a particular side of fuel cell component 100 being used to input fuel (the electrodes associated with this side, the anode, having a negative electrical polarity) and the other side to input oxidizer (the electrodes associated with this side, the cathode, having a plus electrical polarity). However, it should be clear that a fuel cell component like fuel cell component 100 may be fabricated where the sides are reversed to produce a "mirror image" fuel cell component. For example, referring to FIG. 9, assume that the left hand side of fuel cell component 100 is utilized to input fuel and the right hand side of fuel cell component 100 is utilized to input oxidizer. In such a case the electrodes on the left hand side of such a fuel cell component would have a negative polarity and the electrodes on the right hand side of such a fuel cell component would have a positive polarity. For a "mirror image" fuel cell component, assume that the left hand side is utilized to input oxidizer and the right hand side is utilized to input fuel. In such a case, the electrodes on the left hand side of such a "mirror image" fuel cell component would have a positive polarity and the electrodes on the right hand side of such a "mirror image" fuel cell component would have a negative polarity.

Figure 10:
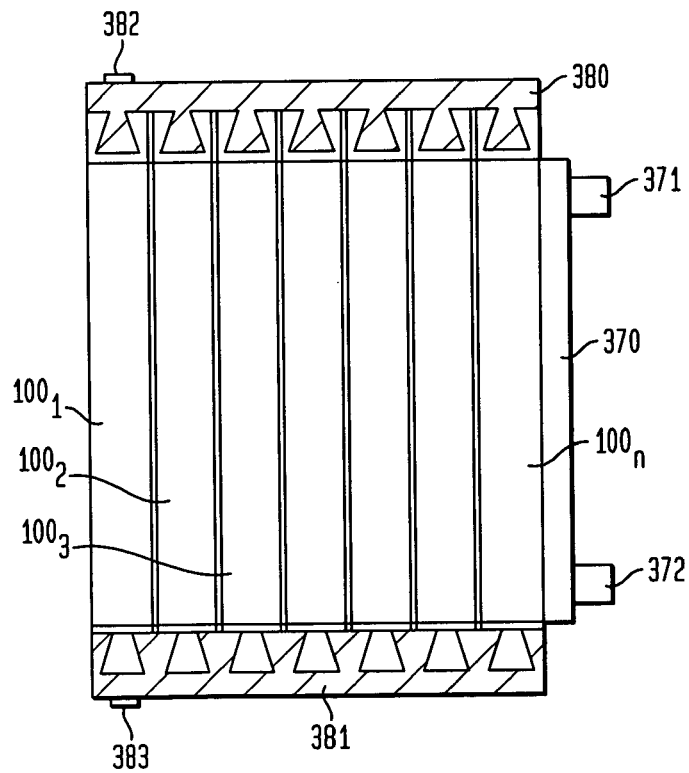
FIG. 10 shows a top view that illustrates the manner in which fuel cell components like the fuel cell component shown in FIG. 9 may be connected electrically in accordance with one or more embodiments of the present invention.

FIG. 10 shows a top view that illustrates the manner in which fuel cell components like fuel cell component 100 shown in FIG. 9 may be connected electrically in accordance with one or more embodiments of the present invention (a depiction of lines separating halves of each fuel cell component has been omitted for ease of understanding the embodiment). As shown in FIG. 10, fuel cell components $100_1$ to $100_n$ are stacked in a side by side fashion. Manifold and fuel cell component assembly support 370 having inlet ports 371 and 372 for fuel and oxidizer, respectively, will be described in more detail below. As shown in FIG. 10, electrical connector 380 having dovetail joints interconnects the cathodes of fuel cell components fuel cell components $100_1$ to $100_n$ and electrical connector 381 having dovetail joints interconnects the anodes of fuel cell components $100_1$ to $100_n$. Terminals 382 and 383 of electrical connectors 380 and 381, respectively, provide connectors for use in making electrical connection to external circuits. It should be clear to those of ordinary skill in the art that the electrical connections among fuel cell components $100_1$ to $100_n$ could be in series or in parallel depending upon the internal configuration of electrical connectors 380 and 381. Further, various alternative electrical connections could be made utilizing "mirror image" fuel cell components described above for all or some of fuel cell components $100_1$ to $100_n$. Portions of electrical connectors 380 and 381 that interconnect to the cathode and anode, respectively of fuel cell components $100_1$ to $100_n$, respectively, may be fabricated from any one of a number of suitable conducting materials that are well known to those of ordinary skill in the art such as, for example and without limitation, copper. Note that individual fuel cell components shown in FIG. 10 may be repaired by sliding an individual fuel cell component out of electrical connectors 380 and 381, and by sliding a new or repaired fuel cell component in its place. In accordance with one or more embodiments of the present invention, the dovetail joints of electrical connectors 380 and 381 could be spring loaded in accordance with any one of a number of methods that are well known to those of ordinary skill in the art. Alternatively, electrical connectors 380 and 381 could be fabricated using a type of connector in a duplex receptacle for plugging a lamp into a wall or outlet, and so forth. Lastly, further fuel components may be connected by fabricating one or more of electrical connectors 380 and 381 to have dovetail connectors on the backside thereof.

Figure 11:
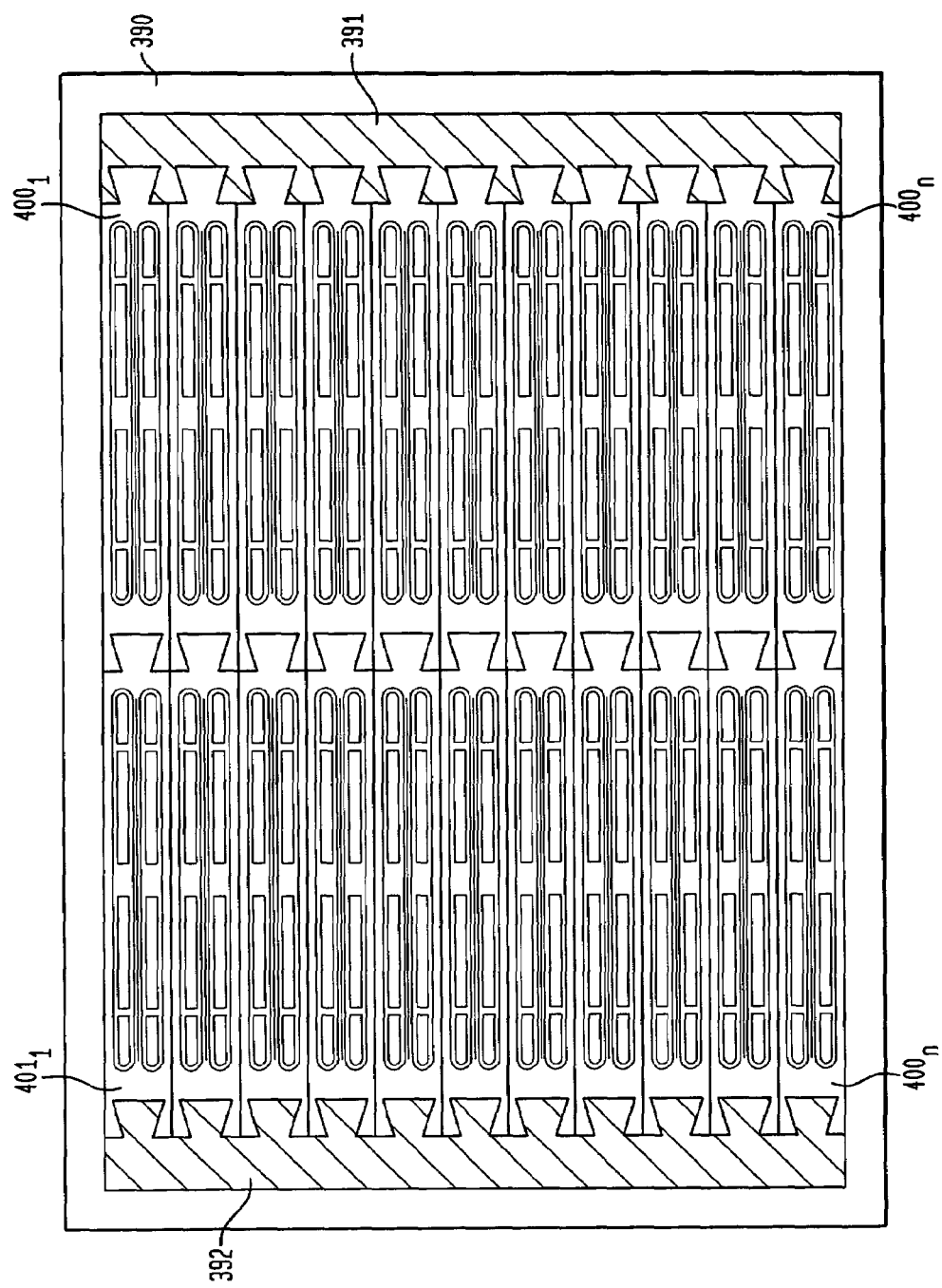
FIG. 11 shows a top view that illustrates the manner in which fuel cell components like the fuel cell component shown in FIG. 9 may be connected electrically in accordance with one or more further embodiments of the present invention.

FIG. 11 shows a top view that illustrates the manner in which fuel cell components like fuel cell component 100 shown in FIG. 9 may be connected electrically in accordance with one or more further embodiments of the present invention (a depiction of lines separating halves of each fuel cell component has been omitted for ease of understanding the embodiment). A manifold for fuel and oxidizer inlet and output ports has been omitted for ease of understanding the embodiment. As shown in FIG. 11, bracket 390 encloses fuel cell components $400_1$ to $400_n$, fuel cell components $401_1$ to $401_n$, and electrical connectors 391 and 392. Electrical connectors 391 and 392 are like electrical connectors 380 and 381 shown in FIG. 10. In addition, fuel cell components $400_1$ to $400_n$ are connected directly to fuel cell components $401_1$ to $401_n$ by use of the dovetail joints disposed in each one (for example, refer to FIG. 9). As was also the case for the embodiment shown in FIG. 10, individual fuel cell components shown in FIG. 11 may be repaired by sliding an individual fuel cell component out of electrical connectors 391 or 392 and the fuel cell component to which it is connected, and by sliding a new or repaired fuel cell component in its place.

Figure 12:
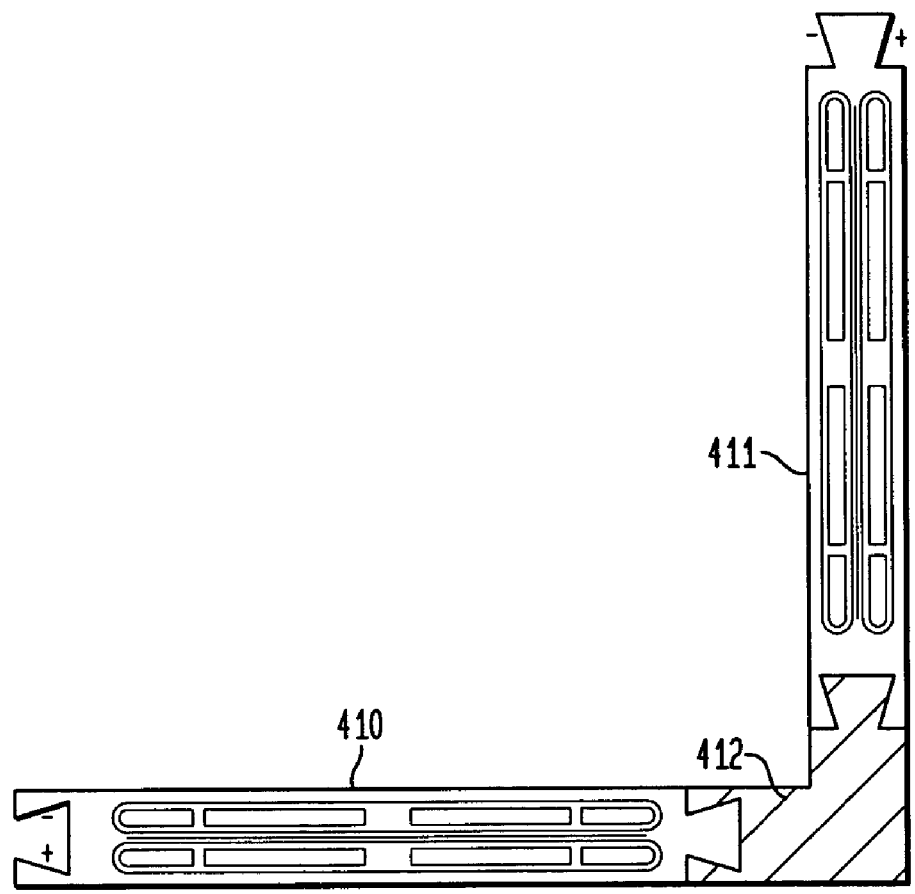
FIG. 12 shows a top view that illustrates the manner in which fuel cell components like the fuel cell component shown in FIG. 9 may be connected electrically in accordance with one or more still further embodiments of the present invention to provide angled assemblies.

FIG. 12 shows a top view that illustrates the manner in which fuel cell components like fuel cell component 100 shown in FIG. 9 may be connected electrically in accordance with one or more still further embodiments of the present invention to provide angled assemblies (a depiction of lines separating halves of each fuel cell component has been omitted for ease of understanding the embodiment). A manifold for fuel and oxidizer inlet and output ports has been omitted for ease of understanding the embodiment. Although fuel cell component 410 and fuel cell component 411 are assembled so they are disposed at right angles to each other, it should readily be appreciated that they may be assembled at any one of a number of angles so that a fuel cell component may assume various shapes and configurations. Other than the shape of electrical connector 412, it may be fabricated like electrical connectors 380 and 381 of FIG. 10 and electrical connectors 390 and 391 of FIG. 11. It should also be understood that electrical connector 412 could also be fabricated to pivot or to be set at any angle. Thus, although FIG. 12 shows a fuel cell component assembly of two fuel cell components, further embodiments include assemblages of multiplicities of fuel cell components, for example and without limitation, a first assemblage like that shown in FIG. 10 or 11 that is connected to a second assemblage like that shown in FIGS. 10 and 11, wherein the first and second assemblages are disposed at an angle. Advantageously, embodiments like that shown in FIG. 12 enable fuel cells to be configured to conform to small spaces.

Figure 13:
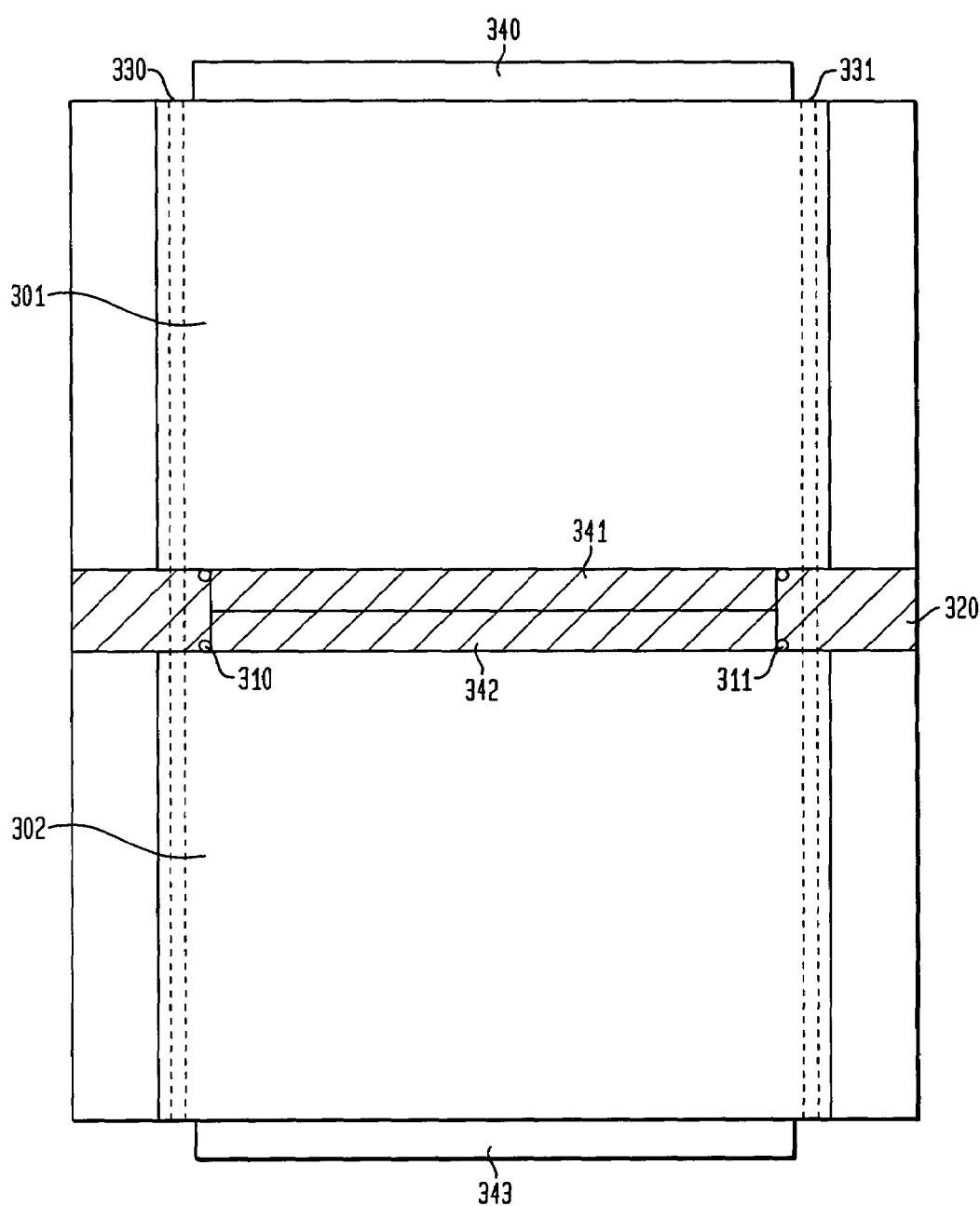
FIG. 13 shows a side view that illustrates the manner in which fuel cell components like fuel cell component shown in FIG. 9 may be stacked in accordance with one or more embodiments of the present invention.

FIG. 13 shows a side view that illustrates the manner in which fuel cell components like fuel cell component 100 shown in FIG. 9 may be stacked in accordance with one or more embodiments of the present invention. As shown in FIG. 13, fuel and oxidizer outputs contained in output portion 341 of the case of fuel cell component 301 are abutted to fuel and oxidizer inputs contained in input portion 342 of the case of fuel cell component 302. Holes 330 and 331 shown in phantom enable the cells to be held against each other using, for example and without limitation screws or threaded rods. As further shown in FIG. 13, O-rings 310 and 311 serve, together with sealing collar 320, to maintain the integrity of the cell-to-cell connection. Collar 320 may be fabricated utilizing any one of a number of methods that are well known to those of ordinary skill in the art. To form the complete fuel cell component assembly: (a) an input manifold (such as those described herein) is affixed to input portion 340 of the case of fuel cell component 301; (b) an output manifold (such as those described herein) is affixed to output portion 343 of the case of fuel cell component 302; and (c) electrical connectors (such as those described herein) are affixed to the cathode and anode terminals, respectively, of fuel cell components 301 and 302.

Figure 14:
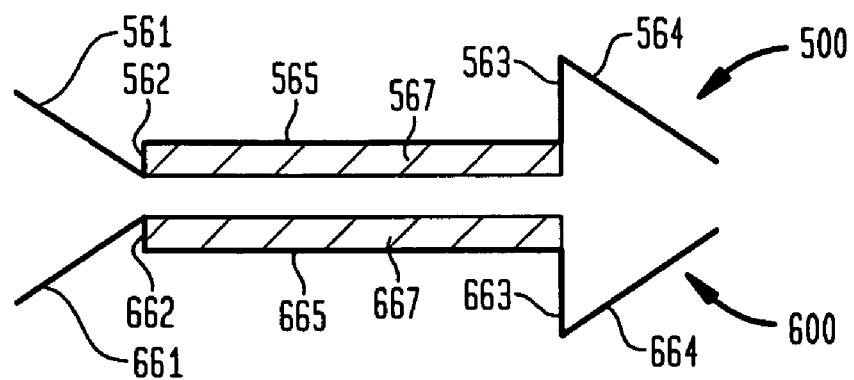
FIG. 14 shows a cross section of electrode structures that are fabricated in accordance with one or more embodiments of the present invention, which electrode structures may be used to fabricate fuel cell components in accordance with one or more embodiments of the present invention.

FIG. 14 shows a cross section of electrode structures 500 and 600 that are fabricated in accordance with one or more embodiments of the present invention, which electrode structures may be used to fabricate fuel cell components in accordance with one or more embodiments of the present invention. As shown in FIG. 14, electrode structure 500 comprises: (a) substantially planar section 565 having at least a conducting surface; (b) wing 561 having at least a conducting surface that makes an angle θ with respect to a surface of section 565; (c) connector 562 having at least a conducting surface; (d) wing 564 having at least a conducting surface that also makes an angle θ with respect to the surface of section 565; and (e) connector 563 having at least a conducting surface. As further shown in FIG. 14, electrode structure 600 comprises: (a) substantially planar section 665 having at least a conducting surface; (b) wing 661 having at least a conducting surface that makes an angle φ with respect to a surface of section 665; (c) connector 662 having at least a conducting surface; (d) wing 664 having at least a conducting surface that also makes an angle φ with respect to the surface of section 665; and (e) connector 663 having at least a conducting surface. In accordance with one or more embodiments of the present invention, wings 561 and 564 form electrodes for conducting plate 500 in much the same way as wings 61 and 62 form electrodes for conducting plate 20 shown in FIG. 3, and wings 661 and 664 form electrodes for conducting plate 600 in much the same way as wings 71 and 72 form electrodes for conducting plate 40 shown in FIG. 3. In accordance with one embodiment of the present invention θ and φ are 30°±10°.

Ends of electrode structures 500 and 600 may be shaped, for example and without limitation, by being bent at an angle, to line portions of one or more of channels in ends of cases like those formed in ends 210, 211, 250 and 251 of cases 10 and 50 described in conjunction with FIG. 6 above.

As further shown in FIG. 14, electrode structures 500 and 600 include regions through which fuel and oxidizer flow, respectively, and which regions are filled with conductive materials 567 and 667, respectively. When a fuel cell component is fabricated to include electrode structure 500 and/or electrode structure 600, conductive material 567 and/or conductive material 667 contacts membrane 30. Electrode structures 500 and 600 may be included in cases to form fuel cell components in much the same manner as was described above with respect to conducting plates 20 and 40. In addition, fuel cell components fabricated to include electrode structure 500 and/or electrode structure 600 may be stacked and assembled in the same manner as was described above. Electrode structures 500 and 600 may be fabricated utilizing gold, platinum, silver, nickel, nickel alloy such as nickel-chrome and nickel-aluminum, suitable metal or metals from Groups 8–11 of the Periodic Table, or an electrically conducting coating such as, for example and without limitation, gold flashing. Conductive materials 567 and 667 may include any one of a number of porous conductive materials that are well known to those of ordinary skill in the art such as, for example and without limitation, conductive fabrics, conductive wools, conductive meshes, and the like. It should also be noted that in accordance with one or more further embodiments of the present invention, electrode structure 500 and/or 600 could have a front surface, i.e., a surface closer to a membrane when a fuel cell component is assembled, that is coated with a hydrophobic material as was disclosed above, and a back surface that is coated with a hydrophilic material as was discussed above.

Figure 15:
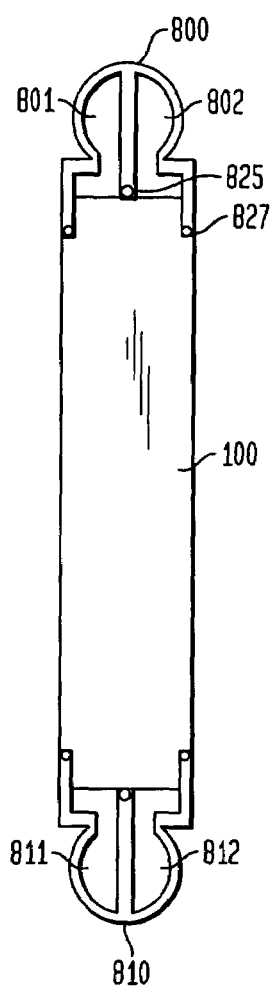
FIGS. 15–17 show various embodiments of the present invention wherein manifolds are utilized to provide fuel and oxidizer to fuel cell components.
Figure 16:
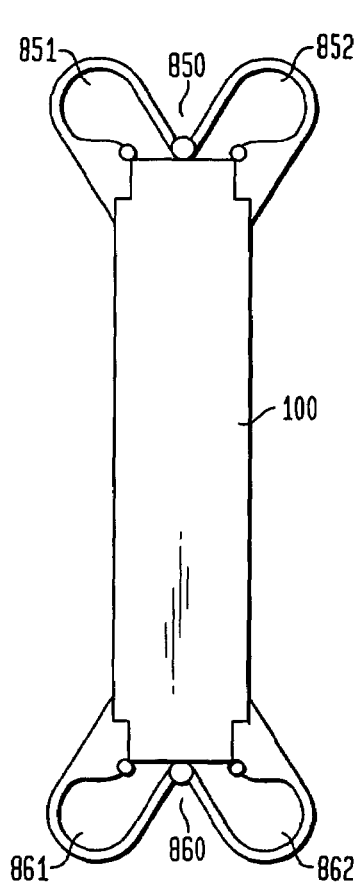
Figure 17:
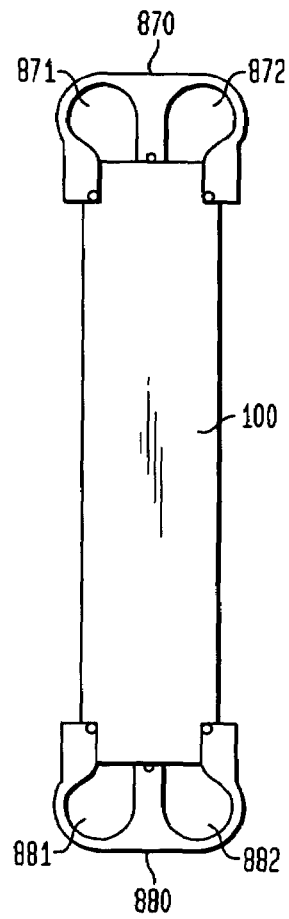

FIGS. 15–17 show various embodiments of the present invention wherein manifolds are utilized to provide fuel and oxidizer to fuel cell components, for example and without limitation, like fuel cell component 100 shown in FIG. 9 (a depiction of lines separating halves of each fuel cell component has been omitted for ease of understanding the embodiments). As shown in FIG. 15, input manifold 800 is sealed to fuel cell component 100 utilizing a sealer comprised of, for example and without limitation, O-rings 825 and 827. Channels 801 and 802 in input manifold 800 provide a mechanism for supplying fuel (in gaseous or liquid form) and oxidizer (in gaseous or liquid form), respectively, as input to fuel cell component 100. Similarly, output manifold 810 is sealed to fuel cell component 100 utilizing a sealer comprised of, for example and without limitation, O-rings. Channels 811 and 812 in output manifold 810 provide a mechanism for exhausting spent fuel (in gaseous or liquid form) and oxidizer (in gaseous or liquid form) as well as reactants that are output, respectively, from fuel cell component 100. Manifolds 800 and 810 may be fabricated from plastics, ceramics, metals, and so forth, and are sized so that fuel cell component 100 can snap into manifolds 800 and 810. Manifolds 800 and 810 are attached to fuel cell component by fasteners, such as, for example and without limitation, screws. In addition, channels 811 and 812 are designed to be sufficiently large so that all the reactant can be exhausted from fuel cell component 100 while operating under maximum input. In accordance with one or more embodiments of the present invention, whenever fuel cell components are assembled into a stack to form a fuel cell component assembly, the fuel cell components are oriented vertically so that reactants such as, for example and without limitation, water may run out of the cell, thereby minimizing corrosion. In accordance with one or more further embodiments of the present invention, the water may be captured and used, for example and without limitation, as at least a part of a supply of liquid coolant.

As shown in FIG. 16, input manifold 850 is sealed to fuel cell component 100 utilizing a sealer comprised of, for example and without limitation, O-rings. Channels 851 and 852 in input manifold 850 provide a mechanism for supplying fuel (in gaseous or liquid form) and oxidizer (in gaseous or liquid form), respectively, as input to fuel cell component 100. Similarly, output manifold 860 is sealed to fuel cell component 100 utilizing a sealer comprised of, for example and without limitation, O-rings. Channels 861 and 862 in output manifold 860 provide a mechanism for exhausting spent fuel (in gaseous or liquid form) and oxidizer (in gaseous or liquid form) as well as reactants that are output, respectively, from fuel cell component 100. Manifolds 850 and 860 may be fabricated from plastics, ceramics, metals, and so forth, and are sized so that fuel cell component 100 can snap into manifolds 850 and 860. Manifolds 850 and 860 are attached to fuel cell component by fasteners, such as, for example and without limitation, screws. In addition, channels 861 and 862 are designed to be sufficiently large so that all the reactant can be exhausted from fuel cell component 100 while operating under maximum input. In accordance with one or more embodiments of the present invention, whenever fuel cell components are assembled into a stack to form a fuel cell component assembly, the fuel cell components are oriented vertically so that reactants such as, for example and without limitation, water may run out of the cell, thereby minimizing corrosion.

As shown in FIG. 17, input manifold 870 is sealed to fuel cell component 100 utilizing a sealer comprised of, for example and without limitation, O-rings. Channels 871 and 872 in input manifold 870 provide a mechanism for supplying fuel (in gaseous or liquid form) and oxidizer (in gaseous or liquid form), respectively, as input to fuel cell component 100. Similarly, output manifold 880 is sealed to fuel cell component 100 utilizing a sealer comprised of, for example and without limitation, O-rings. Channels 881 and 882 in output manifold 880 provide a mechanism for exhausting spent fuel (in gaseous or liquid form) and oxidizer (in gaseous or liquid form) as well as reactants that are output, respectively, from fuel cell component 100. Manifolds 870 and 880 may be fabricated from plastics, ceramics, metals, and so forth, and are sized so that fuel cell component 100 can snap into manifolds 870 and 880. Manifolds 870 and 880 are attached to fuel cell component by fasteners, such as, for example and without limitation, screws. In addition, channels 881 and 882 are designed to be sufficiently large so that all the reactant can be exhausted from fuel cell component 100 while operating under maximum inputs. In accordance with one or more embodiments of the present invention, whenever fuel cell components are assembled into a stack to form a fuel cell component assembly, the fuel cell components are oriented vertically so that reactants such as, for example and without limitation, water may run out of the cell, thereby minimizing corrosion.

Figure 18:
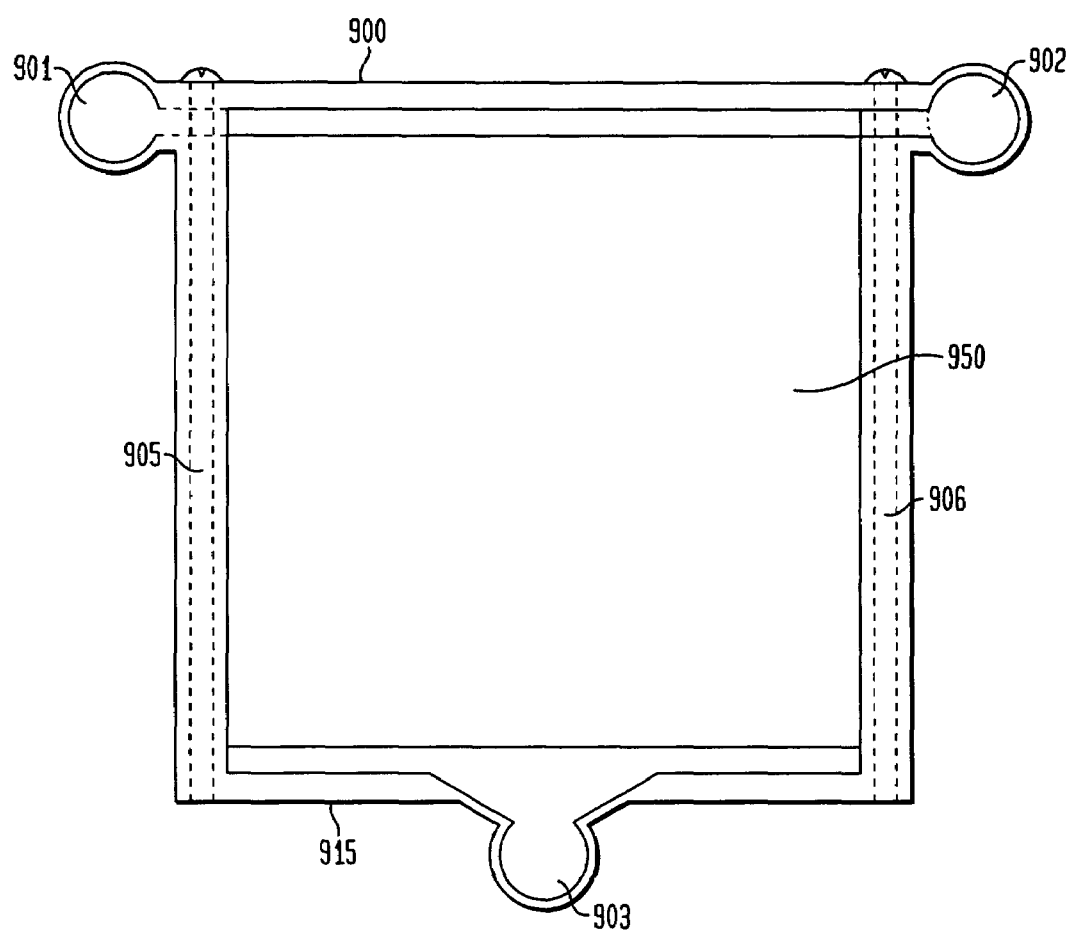
FIG. 18 shows a front view of an assembly of fuel cell components like the fuel cell component shown in FIG. 9.

FIG. 18 shows a front view of an assembly of fuel cell components 950 like fuel cell component 100 shown in FIG. 9. FIG. 18 illustrates one embodiment of a manifold for holding fuel cell components together in an assembly. As shown in FIG. 18, input manifold 900 includes fuel gas or liquid input port 902, and oxidizer gas or liquid input port 901. As further shown in FIG. 18, output manifold 915 includes gas and liquid output port 903. Input manifold 900 and output manifold 915 may be fabricated from plastic, metal, ceramic, and the like. Dotted lines 905 and 906 show holes in a fuel cell component that is attached to input manifold 900 and output manifold 915. Further, clamps, latches, hooks, snaps, and so forth could also be used to attached a fuel cell component to input manifold 900 and output manifold 915. In accordance with one or more embodiments of the present invention, various ones of the fuel cell components may be affixed to a manifold by sliding or snapping into grooves in the manifold. In alternative embodiments, the fuel cell components could be affixed in such grooves, for example and without limitation, by glue. Thus, in accordance with one or more embodiments of the present invention, fuel cell components may be affixed to the manifold in groups, for example, of ten. Note that in one or more further embodiments of the present invention, the manifold shown in FIG. 19 might have alternate routing of fuel and oxidizer when one or more of the fuel cell components in an assembly were "mirror image" fuel cell components described above. Lastly, it should be appreciated that one or more embodiments of the present invention include a manifold that can feed fuel cell components arranged on either side of input manifold 900. For example, in such embodiments, one might utilize two output manifolds.

Figure 19:
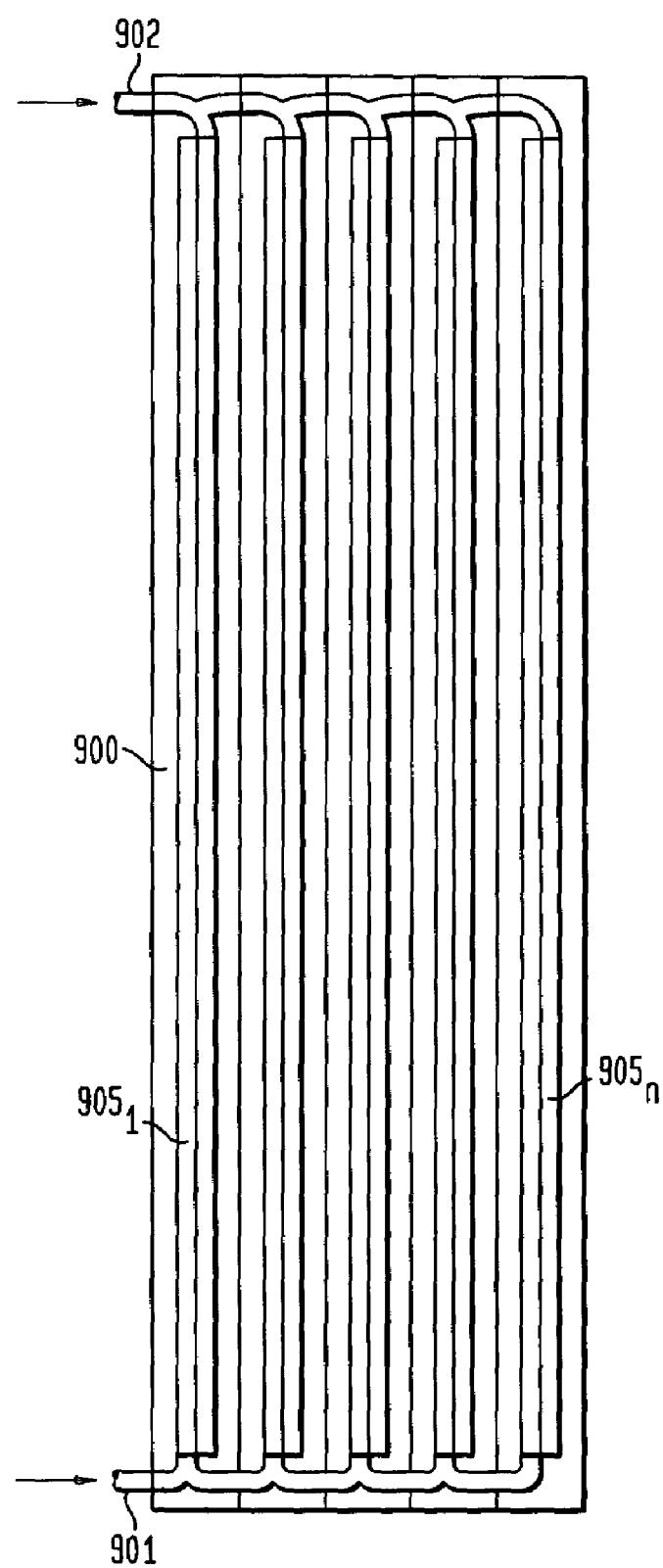
FIG. 19 shows a top open view of the assembly of fuel cell components shown in FIG. 18.

FIG. 19 shows a top open view of the assembly of fuel cell components shown in FIG. 18. As shown in FIG. 19, fuel gas or liquid input port 902 of input manifold 900 is connected to fuel gas or liquid input ports of fuel cell component manifolds $905_1$–$905_n$, for example and without limitation, like those shown in FIGS. 15–17 and oxidizer gas or liquid input port 901 of input manifold 900 is connected to oxidizer gas or liquid input ports of fuel cell component manifolds $905_1$–$905_n$, for example and without limitation, like those shown in FIGS. 15–17.

Figure 20:
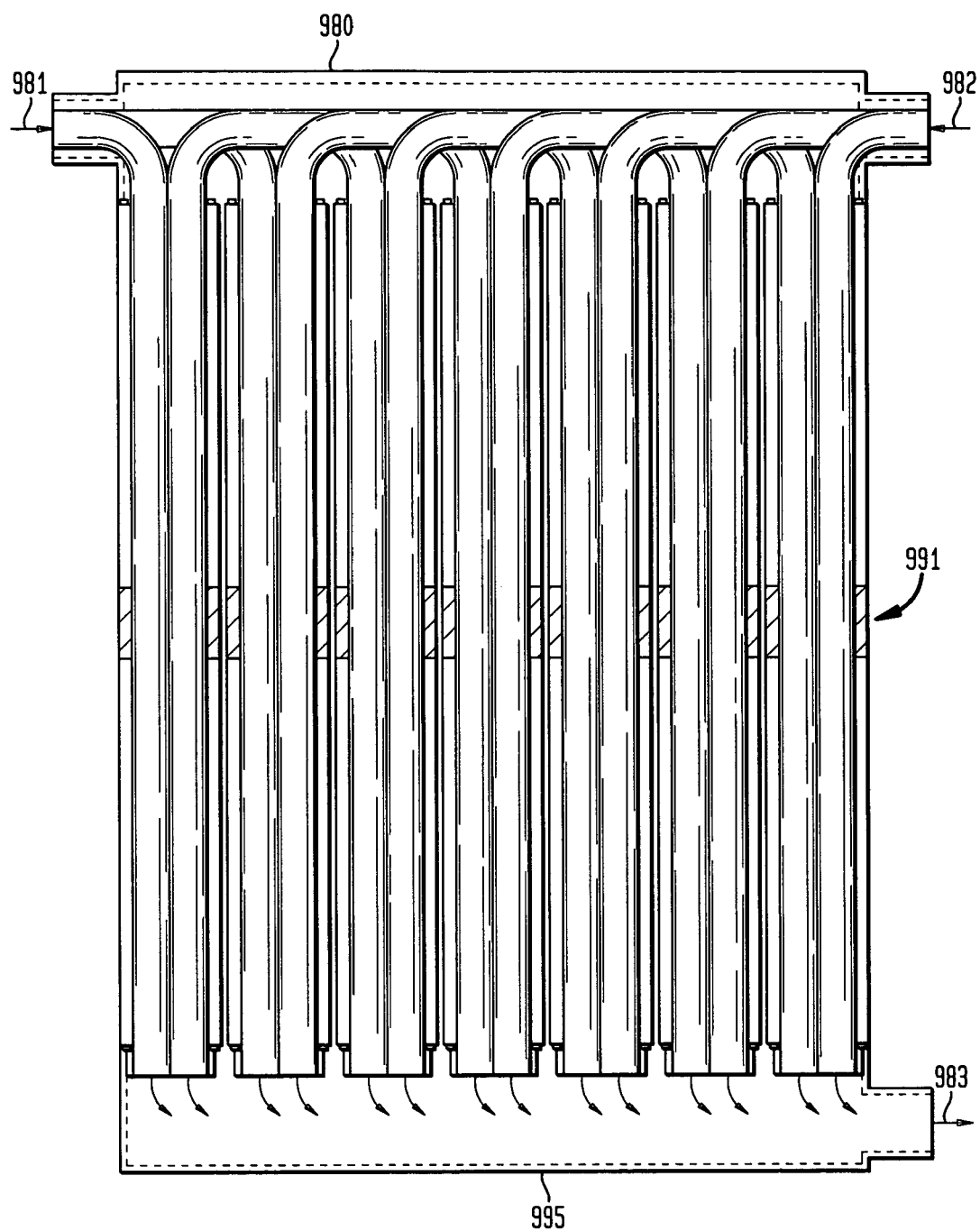
FIG. 20 shows a side view of an assembly of fuel cell components like the fuel cell component shown in FIG. 9.

FIG. 20 shows a side view of an assembly of fuel cell components like fuel cell component 100 shown in FIG. 9. FIG. 20 illustrates one embodiment of a manifold for holding fuel cell components together in an assembly. As shown in FIG. 20, input manifold 980 includes fuel gas or liquid input port 982, and oxidizer gas or liquid input port 981. As further shown in FIG. 20, output manifold 995 includes gas and liquid output port 983. Input manifold 980 and output manifold 995 may be fabricated from plastic, metal, ceramic, and the like. Connector 991 is attached to input manifold 980 and output manifold 995. Connector 991 is attached to the fuel cell components by attachment mechanisms such as, for example and without limitation, screws, clamps, latches, hooks, snaps, and so forth.

Although various embodiments of the present invention were described using hydrogen as a fuel and oxygen as an oxidizer, embodiments of the present invention are not limited thereby. In particular, one or more embodiments of the present invention include hydrogen produced, for example and without limitation, by a fuel reformer utilizing any hydrocarbon fuel from natural gas to methanol, including even gasoline. Further, the oxidizer could be oxygen or air. In fact, in principle, the fuel and oxidizer could be any gas or liquid that may serve to provide an appropriate electrochemical reduction-oxidation process. Thus, one or more embodiments of the present invention include fuel cell components used in a liquid fuel cell.

A fuel cell assembly that utilizes a fuel cell component and/or stacks thereof that are fabricated in accordance with one or more embodiments of the present invention would further comprise a fuel source and an oxidizer source like those described above. As is further well known, the fuel and oxidizer source can comprise a fuel pump and an oxidizer pump for pumping, for example and without limitation, hydrogen and air, respectively, at various pressures, for example, and without limitation, at about or below 50 PSI. In a particular application, there will be a trade-off between the energy and financial cost associated with, for example and without limitation, compressing air to higher pressures and improved performance. Because a PEM fuel cell uses a solid electrolyte, a significant pressure differential can be maintained across the electrolyte. This enables operation of the PEM fuel cell with low pressure fuel and higher pressure air, if desired, to optimize performance.

One or more embodiments of the present invention may also be utilized for an acid fuel (for example and without limitation, a water solution comprising acid) or an organic fuel (for example and without limitation, methanol). For example, a pump would be provided for pumping an acid-fuel solution into an anode chamber of the fuel cell component, while an oxygen or air compressor provides oxygen or air into a cathode chamber. Carbon dioxide formed in the anode compartment would be exhausted by an exit manifold, and the fuel solution could be re-circulated. To the acid-fuel solution it is possible to add a soluble catalyst such as, for example and without limitation, a macrocyclic complex of nickel, cobalt or iron. Such a complex may promote the oxidation of the fuel and/or the reduction of the oxygen.

In accordance with one or more further embodiments of the present invention, water obtained in the exhaust streams may be collected and combined with a larger liquid cooling water supply. As is known, solid polymer fuel cell systems are typically liquid-cooled rather than air-cooled if higher power densities (power output capability per unit volume) are required because their cooling systems must shed a significant amount of heat at relatively low temperature (i.e., about 80° C.) with respect to ambient temperature. In addition, the use of liquid—as opposed to air-cooling—allows fuel cell stack cooling channels to be made smaller, and hence a lower overall stack volume can be obtained. However, air-cooled fuel cell systems may be preferred in many applications where power density is less important.

Although various embodiments that incorporate the teachings of the present invention have been shown and described in detail herein, those skilled in the art can readily devise many other varied embodiments that still incorporate these teachings. For example, although embodiments of the present invention described above related principally to planar fuel cell components, it should be understood that the present invention is not limited thereto and includes embodiments wherein fuel cell components have other shapes such as curved surfaces.

What is claimed is:

1. A fuel cell component that comprises:
   a membrane structure;
   a fuel electrode disposed on one side of and in contact with the membrane structure;
   an oxidizer electrode disposed on a second side of and in contact with the membrane structure; and
   the fuel electrode comprising a fuel distribution portion in contact with the membrane structure and connected to a fuel electrical connection portion not in contact with the membrane structure, and the oxidizer electrode comprising an oxidizer distribution portion in contact with the membrane structure and connected to an oxidizer electrical connection portion not in contact with the membrane structure;
   wherein a surface encompassing a face of the fuel electrical connection portion is disposed at a non-zero angle with respect to a surface encompassing a face of the fuel distribution portion in contact with the membrane structure and a surface encompassing a face of the oxidizer electrical connection portion is disposed at a non-zero angle with respect to a surface encompassing a face of the oxidizer distribution portion in contact with the membrane structure.

2. The fuel cell component of claim 1 wherein the membrane structure includes a catalyst.

3. The fuel cell component of claim 1 wherein the fuel distribution portion includes grooves disposed therein and the oxidizer distribution portion includes grooves disposed therein.

4. The fuel cell component of claim 1 wherein the fuel distribution portion comprises a conductive hydrophobic material disposed thereon.

5. The fuel cell component of claim 1 wherein the oxidizer distribution portion comprises a conductive hydrophobic material disposed thereon.

6. The fuel cell component of claim 1 wherein the fuel distribution portion includes a porous conductive material disposed in a cavity therein and the oxidizer distribution portion includes a porous conductive material disposed in a cavity therein.

7. The fuel cell component of claim 1 wherein the fuel electrode comprises a fuel input portion and a fuel exhaust portion and wherein the oxidizer electrode comprises an oxidizer input portion and an oxidizer exhaust portion.

8. The fuel cell component of claim 7 wherein a surface encompassing a face of the fuel input portion is disposed at a non-zero angle with respect to the surface encompassing a face of the fuel distribution portion in contact with the membrane structure and wherein a surface encompassing a face of the oxidizer input portion is disposed at a non-zero angle with respect to the surface encompassing a face of the oxidizer distribution portion in contact with the membrane structure.

9. The fuel cell component of claim 7 wherein a surface encompassing a face of the fuel exhaust portion is disposed at a non-zero angle with respect to the surface encompassing a face of the fuel distribution portion in contact with the membrane structure and wherein a surface encompassing a face of the oxidizer exhaust portion is disposed at a non-zero angle with respect to the surface encompassing a face of the oxidizer distribution portion in contact with the membrane structure.

10. The fuel cell component of claim 1 which further comprises a connector disposed with sides oriented at non-zero angles to contact the fuel electrical connection portion and the oxidizer electrical connection portion.

11. The fuel cell component of claim 1
    wherein the membrane structure includes a catalyst comprised of selenium.

* * * * *